(12) United States Patent
Bakalash

(10) Patent No.: US 10,838,480 B2
(45) Date of Patent: Nov. 17, 2020

(54) APPARATUS AND METHOD FOR POWER MANAGEMENT OF A COMPUTING SYSTEM

(71) Applicant: Google LLC, Mountain View, CA (US)

(72) Inventor: Reuven Bakalash, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/751,408

(22) Filed: Jan. 24, 2020

(65) Prior Publication Data
US 2020/0159310 A1    May 21, 2020

Related U.S. Application Data

(60) Continuation of application No. 16/162,059, filed on Oct. 16, 2018, now Pat. No. 10,545,565, which is a continuation of application No. 15/041,342, filed on Feb. 11, 2016, now Pat. No. 10,120,433, which is a division of application No. 12/985,594, filed on Jan. 6, 2011, now Pat. No. 9,275,430, which is a continuation-in-part of application No. 12/229,215, filed on Aug. 20, 2008, now abandoned, and a continuation-in-part of application No. 12/077,072, (Continued)

(51) Int. Cl.
*G06F 1/3234* (2019.01)
*G06T 1/00* (2006.01)
*G06T 15/00* (2011.01)
*G06T 1/60* (2006.01)
*G09G 3/20* (2006.01)
*G06T 1/20* (2006.01)
*G09G 5/393* (2006.01)
*G09G 5/36* (2006.01)

(52) U.S. Cl.
CPC .............. *G06F 1/3265* (2013.01); *G06T 1/00* (2013.01); *G06T 1/60* (2013.01); *G06T 15/005* (2013.01); *G09G 3/2088* (2013.01); *G06T 1/20* (2013.01); *G09G 5/363* (2013.01); *G09G 5/393* (2013.01); *G09G 2360/08* (2013.01)

(58) Field of Classification Search
CPC . G06F 1/3265; G06T 1/00; G06T 1/60; G06T 15/005; G06T 1/20; G09G 3/2088; G09G 5/363; G09G 5/393; G09G 2360/08
See application file for complete search history.

(56) References Cited

U.S. PATENT DOCUMENTS 6,473,086 B1   10/2002  Morein et al.
6,578,068 B1    6/2003  Bowman-Amuah
(Continued)

*Primary Examiner* — Abderrahim Merouan
(74) *Attorney, Agent, or Firm* — Fish & Richardson P.C.

(57) ABSTRACT

A multiple graphics processing unit (GPU) based parallel graphics system comprising multiple graphics processing pipelines with multiple GPUs supporting a parallel graphics rendering process having an object division mode of operation. Each GPU comprises video memory, a geometry processing subsystem and a pixel processing subsystem. According to the principles of the present invention, pixel (color and z depth) data buffered in the video memory of each GPU is communicated to the video memory of a primary GPU, and the video memory and the pixel processing subsystem in the primary GPU are used to carry out the image recomposition process, without the need for dedicated or specialized apparatus.

9 Claims, 18 Drawing Sheets

Figure 1A:
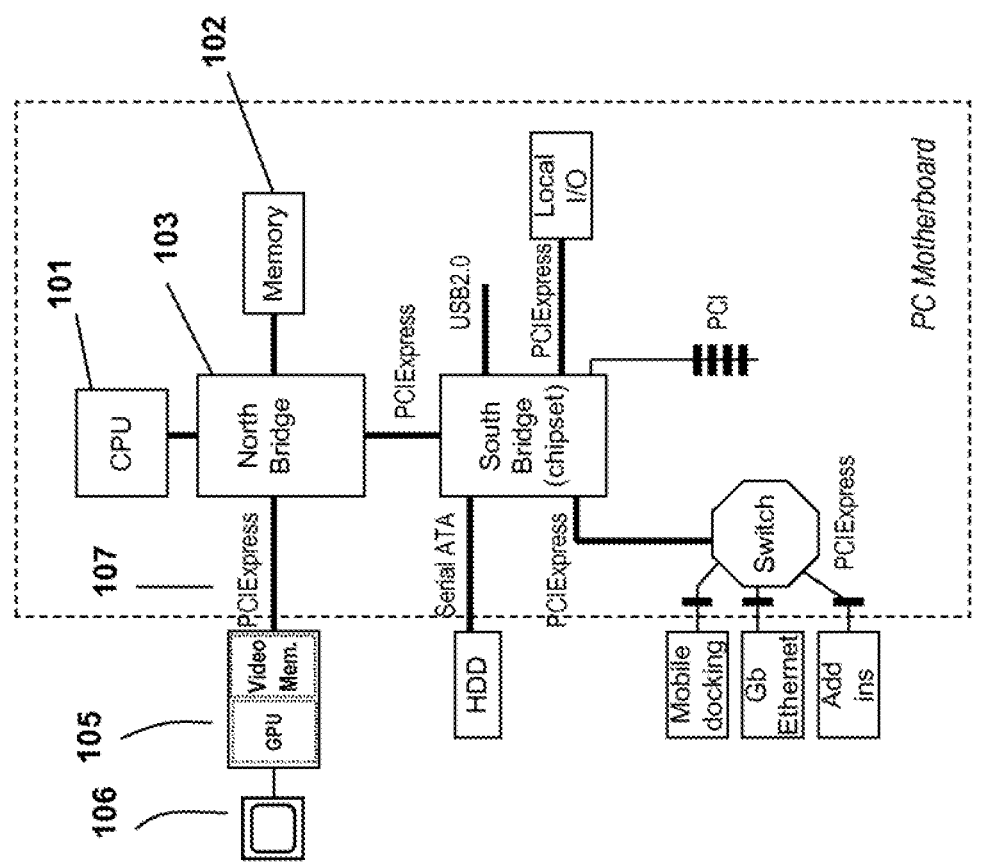

Related U.S. Application Data filed on Mar. 14, 2008, now abandoned, and a continuation-in-part of application No. 11/897,536, filed on Aug. 30, 2007, now Pat. No. 7,961,194, and a continuation-in-part of application No. 11/789,039, filed on Apr. 23, 2007, now abandoned, and a continuation-in-part of application No. 11/655,735, filed on Jan. 18, 2007, now Pat. No. 8,085,273, and a continuation-in-part of application No. 11/648,160, filed on Dec. 31, 2006, now Pat. No. 8,497,865.

(56) References Cited

U.S. PATENT DOCUMENTS

| | | |
|---|---|---|
| 6,938,176 B1 | 8/2005 | Alben et al. |
| 7,254,639 B1 | 8/2007 | Siegel |
| 7,370,100 B1 | 5/2008 | Gunturu |
| 7,426,597 B1 | 9/2008 | Tsu et al. |
| 7,446,316 B2 | 12/2008 | Alben et al. |
| 7,528,836 B2 | 5/2009 | Diard |
| 7,721,118 B1 | 5/2010 | Tamasi et al. |
| 7,788,516 B2 | 8/2010 | Conroy et al. |
| 8,334,874 B2 | 12/2012 | Nam |
| 9,016,677 B2 | 4/2015 | Casonato |
| 2003/0158842 A1 | 8/2003 | Levy et al. |
| 2005/0086040 A1 | 4/2005 | Davis |
| 2005/0155033 A1* | 7/2005 | Luoffo ............... G06F 9/5088 718/104 |
| 2005/0165295 A1 | 7/2005 | Li et al. |
| 2005/0166207 A1 | 7/2005 | Baba et al. |
| 2005/0200627 A1 | 9/2005 | Desylva |
| 2006/0028478 A1 | 2/2006 | Rubinstein et al. |
| 2006/0232590 A1 | 10/2006 | Bakalash et al. |
| 2006/0268005 A1 | 11/2006 | Hutchins et al. |
| 2006/0282604 A1* | 12/2006 | Temkine ............... G09G 5/363 710/314 |
| 2007/0049133 A1* | 3/2007 | Conroy ............... G06F 1/26 439/894 |
| 2007/0050650 A1 | 3/2007 | Conroy et al. |
| 2007/0143640 A1 | 6/2007 | Simeral |
| 2007/0195099 A1 | 8/2007 | Diard et al. |
| 2008/0030509 A1 | 2/2008 | Conroy et al. |
| 2009/0177864 A1 | 7/2009 | Moreton |
| 2009/0295794 A1* | 12/2009 | Fan ............... G06F 9/5094 345/419 |

\* cited by examiner

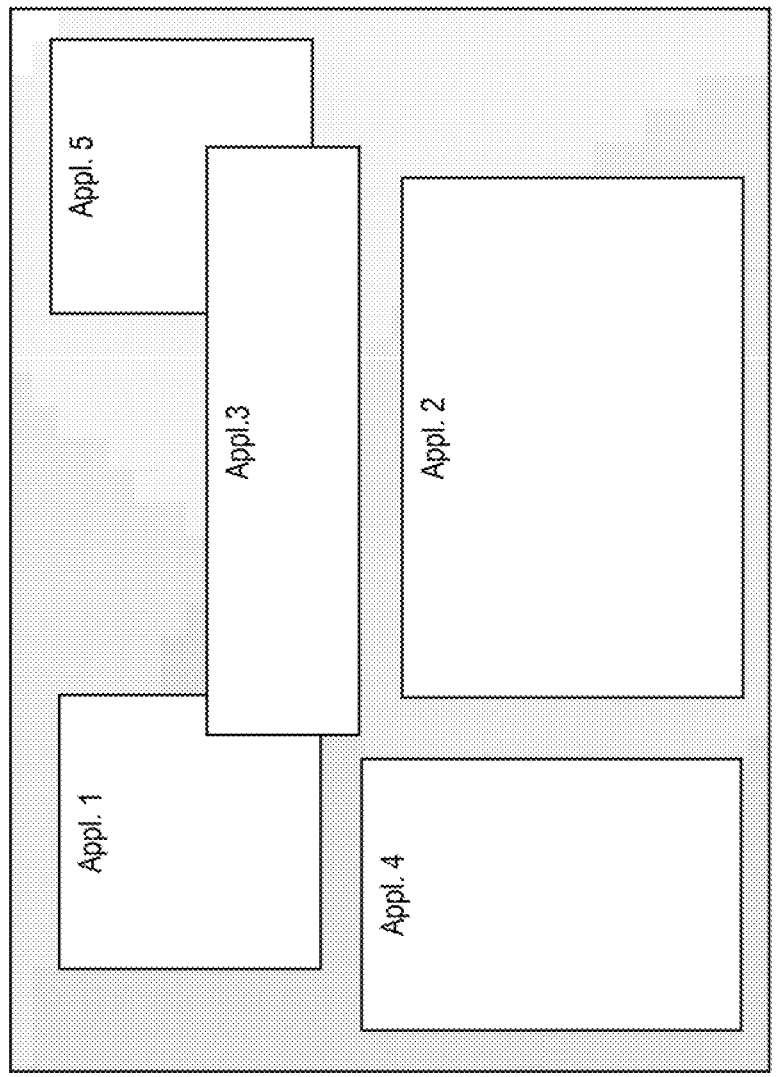

US 10,838,480 B2

APPARATUS AND METHOD FOR POWER MANAGEMENT OF A COMPUTING SYSTEM

CROSS-REFERENCE TO RELATED CASES

The present Application is a continuation of U.S. patent application Ser. No. 16/162,059, filed Oct. 16, 2018, which is a continuation of U.S. patent application Ser. No. 15/041,342, now U.S. Pat. No. 10,120,433, filed Feb. 11, 2016, which is a divisional of U.S. patent application Ser. No. 12/985,594, now U.S. Pat. No. 9,275,430, filed Jan. 6, 2011, which is a Continuation-in-Part (CIP) of the following U.S. Applications: application Ser. No. 12/229,215 filed Aug. 20, 2008; application Ser. No. 12/077,072 filed Mar. 14, 2008; application Ser. No. 11/897,536 filed Aug. 30, 2007; application Ser. No. 11/890,039 filed Apr. 23, 2007; application Ser. No. 11/655,735 filed Jan. 18, 2007; and application Ser. No. 11/648,160 filed Dec. 31, 2006; each said Patent Application being incorporated herein by reference as if set forth fully herein.

BACKGROUND OF INVENTION

Field of Invention

The present invention relates generally to the field of computer graphics rendering, and more particularly, to ways of and means for improving the performance and power and resources management of parallel graphics rendering processes supported on multiple 3D graphics processing unit (GPU) platforms associated with diverse types of computing machinery.

Brief Description of the State of Knowledge in the Art

There is a great demand for high performance computer graphics systems in the fields of product design, simulation, virtual-reality, video-gaming, scientific research, and personal computing (PC). A major goal of the computer graphics industry is to realize real-time photo-realistic 3D imagery on PC-based workstations, desktops, laptops, and mobile computing devices, while efficiently using electrical power and graphics processing resources for constantly changing application requirements in any given application environment.

Currently, a number of different computer graphics processing architectures have been developed for PC-based computing systems.

For example, as shown in FIGS. IA, a typical PC based graphic architecture has an external graphics card (105) comprising a graphics processing unit (GPU) and video memory. As shown, the graphic card is connected to the display (106) on one side, and the CPU (101) through bus (e.g. PCI-Express) (107) and Memory Bridge (103, termed also "chipset", e.g. 975 by Intel), on the other side. As shown in FIG. 1C, the host CPU program/memory space stores the graphics applications, the standard graphics library, and the vendor's GPU drivers.

Figure 1B:
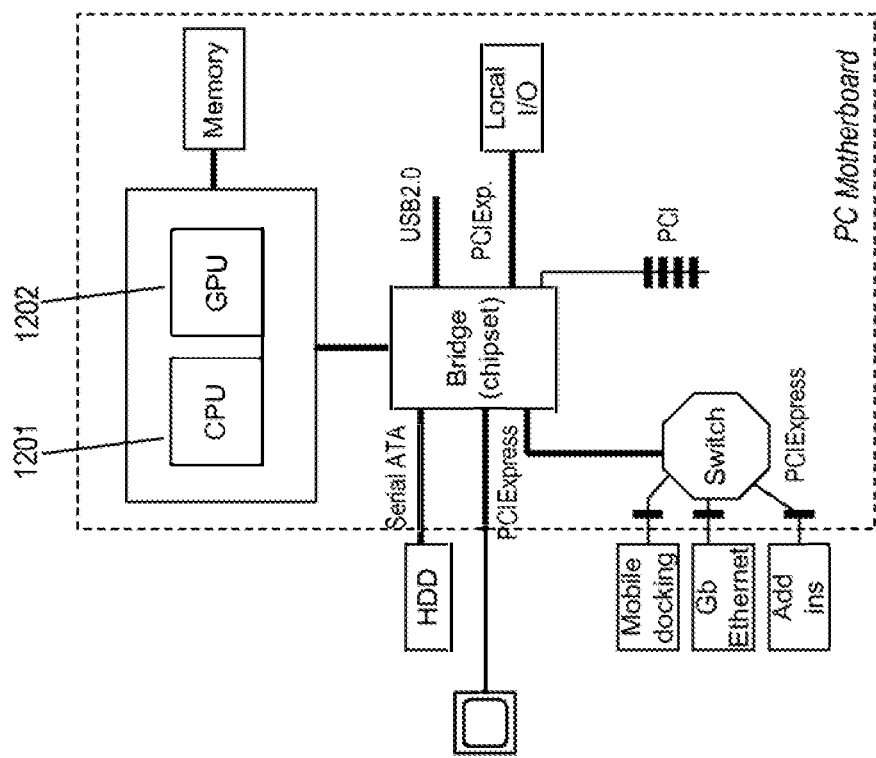
Figure 1C:
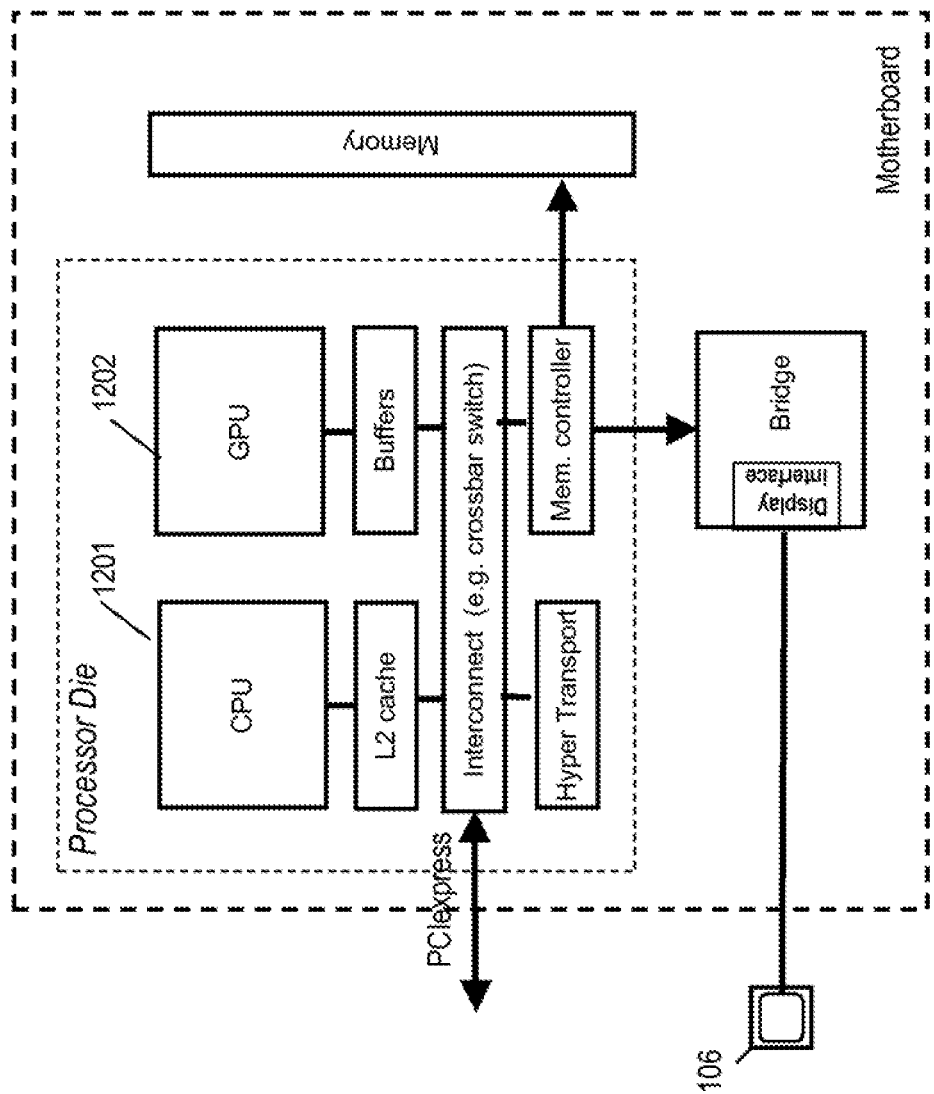

As shown in FIGS. 1B and 1C, a prior art PC-based computing system employs a conventional Fusion-type CPU/GPU hybrid architecture, wherein a single GPU implemented on the same die as the CPU is used to support a graphics pipeline that drives an external display device. As shown, the motherboard supports the processor die, memory, a bridge with a display interface for connecting to a display device (106), and a PCI-express bus. As shown, the processor die supports a CPU (1241), a GPU (1242), L2 cache, buffers, an Interconnect (e.g. crossbar switch), a hyper transport mechanism and a memory controller.

Figure 1D:
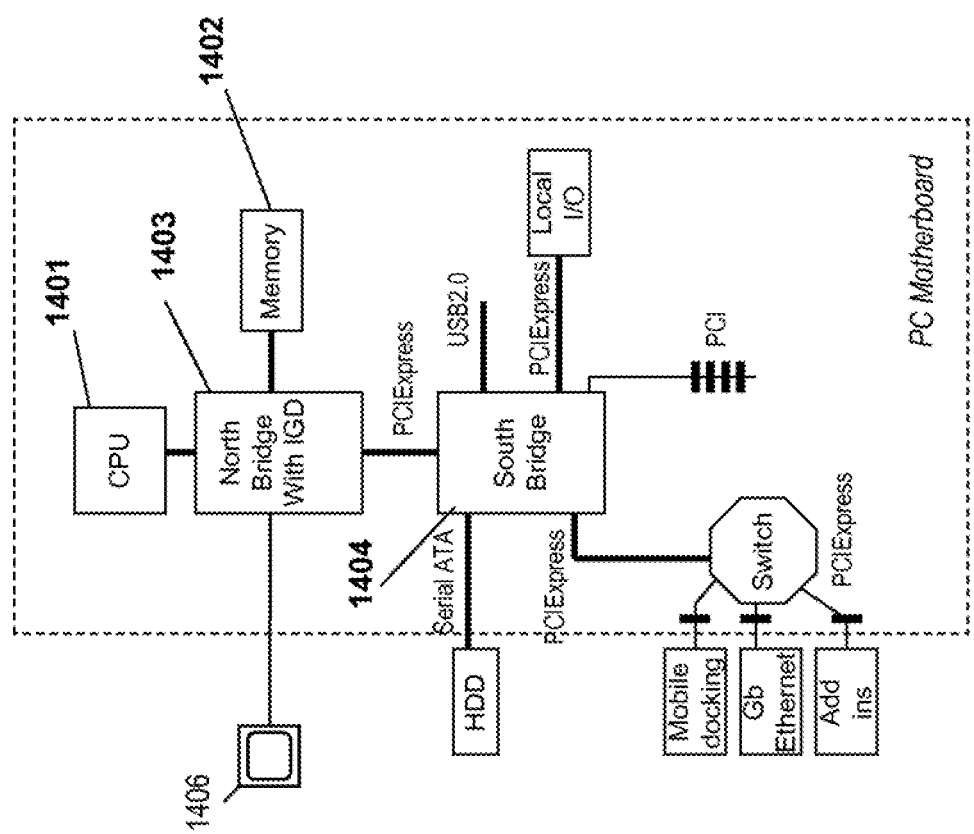
Figure 1E:
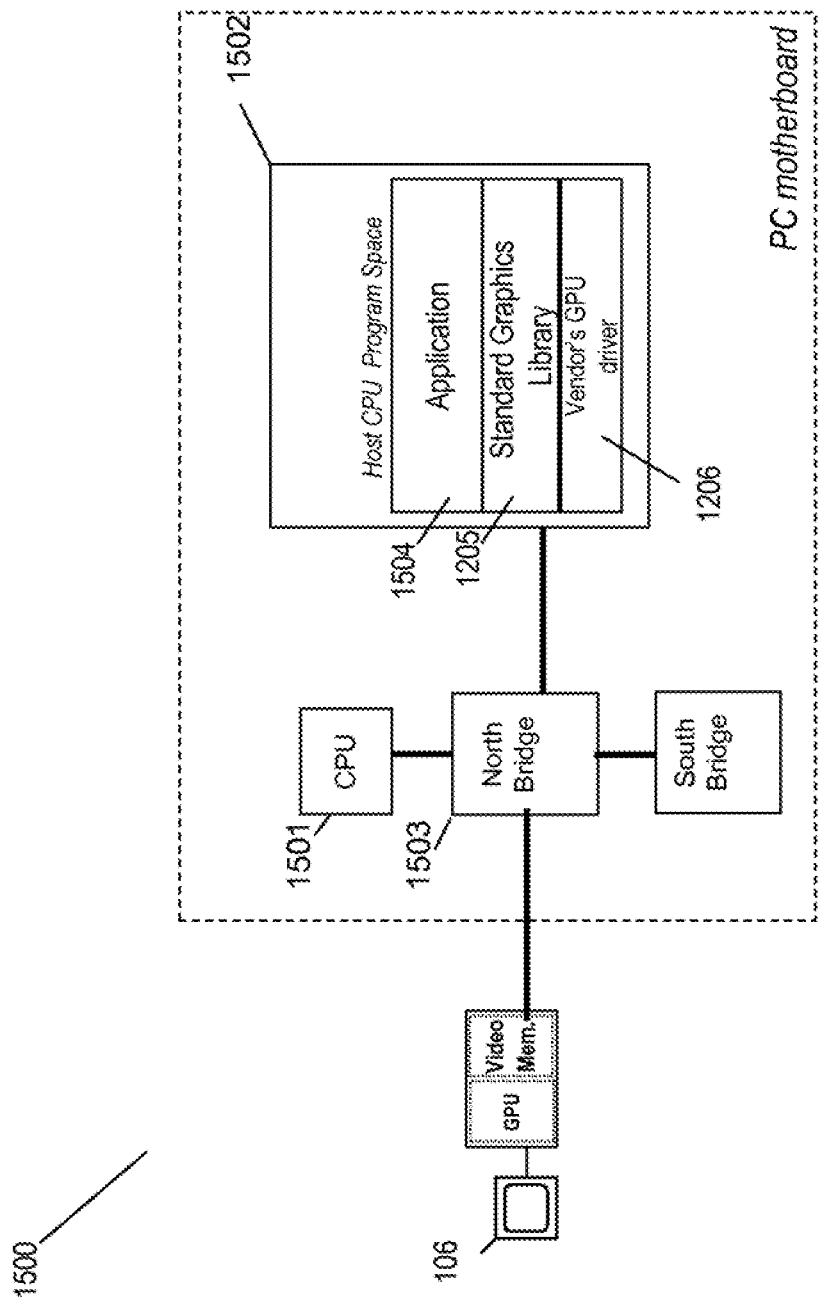

As shown in FIG. 1D, the general software architecture of prior art graphic system (200) comprises: the graphics application (201), standard graphics library (202), and vendor's GPU driver (203). This graphic software environment resides in the "program space" of main memory (102) on the host computer system. As shown, the graphic application (201) runs in the program space, building up the 3D scene, typically as a data base of polygons, each polygon being represented as a set of vertices. The vertices and others components of these polygons are transferred to the graphic card(s) for rendering, and displayed as a 2D image, on the display screen.

As shown in FIGS. IE, a typical prior art PC-based computing system employs a conventional graphics architecture employing a North memory bridge with an integrated graphics device (IGD) (103). The IGD supports a single graphics pipeline process, and is operably coupled to a South bridge, via a PCI-express bus, for supporting the input/output ports of the system. As shown, the IGD includes a video engine, a 2D engine, a 3D engine, and a display engine.

Modern high-end GPUs have more transistors, offer at least an order of magnitude more of computational performance than CPUs, and draw more power. GPU is the primary power consumer in computing system, particularly in multiple-GPU parallel systems where the power consumption rises manifold. Therefore it is highly desired, particularly for high-end graphics, to manage power consumption by turning off the power of external GPUs to a low-power state when inactive. Power management reduces overall energy consumption, prolongs battery life for portable graphics systems, reduces cooling requirements, reduces noise, and reduces operating costs for energy and cooling. Lower power consumption also means lower heat dissipation, which increases system stability, and less energy use, which saves money and reduces the impact on the environment.

Thus, there is a great need in the art for a new and improved way of and means for practicing 3D graphics rendering processes in modem multiple-GPU based computer graphics systems, while avoiding the shortcomings and drawbacks of such prior art methodologies and apparatus.

SUMMARY AND OBJECTS OF THE PRESENT INVENTION

Accordingly, a primary object of the present invention is to provide a new and improved method of and apparatus for practicing graphics resource management (GRM) for 2D and 3D graphics rendering processes in modem multiple-GPU based computer graphics systems, while avoiding the shortcomings and drawbacks associated with prior art apparatus and methodologies.

Another object of the present invention is to provide a novel multi-GPU graphics processing and display subsystem embodied within a PC-level computing system having (i) host memory space (HMS) for storing multiple graphics-based applications and a graphics library for generating graphics commands and data (GCAD) during the run-time (i.e. execution) of the graphics-based applications, (ii) one or more CPUs for executing the graphics-based applications, and (iii) a display device for displaying images containing graphics during the execution of the graphics-based applications.

Another object of the present invention is to provide such a multi-GPU graphics processing and display subsystem comprising: a multi-GPU graphics rendering subsystem supporting both a single-GPU multi-threading (non-parallel) mode of graphics processing operation and a multi-GPU "application-division" parallel mode of graphics processing operations, in order to execute graphic commands and process graphics data (GCAD) render pixel-composited images containing graphics for display on a display device during the run-time of the multiple graphics-based applications, and an automatic mode control module (AMCM) for automatically controlling the mode of operation of the multi-GPU graphics processing and display subsystem during the run-time of the graphics-based applications.

Another object of the present invention is to provide such a multi-GPU graphics processing and display subsystem, wherein the automatic mode control module employs the real-time analysis of application profiles and determination of which GPUs should be assigned to handle and processing the stream of graphics command and data (GCAD) of particular graphics applications running on the PC-based computing system.

Another object of the present invention is to provide such a multi-GPU graphics processing and display subsystem, which adapts in a continuous periodic manner to meet the changing needs of the diverse graphics applications such as web browsers, chat clients, IM clients, video conferencing clients, spreadsheet programs, social network applications and 3D graphics applications, that are simultaneously running on the graphics desktop environment.

Another object of the present invention is to provide such a multi-GPU graphics processing and display subsystem, wherein an automatic mode control module is provided for automatically reading the name of each graphics application running on the computing system, and comparing the name with names of graphics-based applications registered in application profile database supported within each a multi-GPU graphics processing and display subsystem.

Another object of the present invention is to provide such a multi-GPU graphics processing and display subsystem, wherein for unknown (random) applications the automatic mode control module reads the initialization header to determine whether the application is a DXIO or DXI 1 application, and based on such determination, automatically sends the graphics commands and data (GCAD) associated with the application to the discrete (external) GPU or dGPU, which assignment needs to occur only once at the beginning of the runtime of the graphics-based application.

Another object of the present invention is to provide a novel PC-based computing system employing a multi-GPU graphics processing and display subsystem supporting multiple modes of graphics processing operation, which ensures the efficient use of electrical power and graphics processing resources while guaranteeing that graphics-based applications run at high levels of graphics performance, exhibiting sharp videos and photos, smooth video playback, astonishing effects, and vibrant colors, photo-realism wherever intended, as well as texture-rich 3D performance in next-generation games.

Another object of the present invention is to provide a novel multi-user computer network supporting a plurality of client machines, wherein each client machine employs the multi-GPU graphics processing and display subsystem of the present invention based on a software-based architecture.

Another object of the present invention is to provide a novel PC-based computing system having a multi-GPU graphics processing and display subsystem that supports both a single-GPU non-parallel (multi-threading) mode of graphics processing operation and a multi-GPU application-division parallel mode of graphics processing operation, and which is capable of optimal management and conservation of electrical power.

Another object of the present invention is to provide an Internet-based central application profile database server system for automatically updating, over the Internet, application profiles (APs) within the local database of the multi-GPU graphics processing and display subsystem of each client machine registered on the network.

Another object of the present invention is to provide such Internet-based Central Application Profile Database Server System which ensures that each multi-GPU graphics processing and display subsystem is optimally programmed at all possible times so that it quickly and continuously offers users high graphics performance through its adaptive multi-GPU graphics operation.

Another object of the present invention is to provide such an Internet-based Central Application Profile Database Server System which supports a Web-based Application Registration and Profile Management Application, that provides a number of Web-based services.

Another object of the present invention is to provide such an Internet-based Central Application Profile Database Server System that enables the multi-GPU graphics processing and display subsystem of registered client computing machines to automatically and periodically upload, over the Internet, Graphic Application Profiles (APs) for storage and use within the Application Profile Database of the multi-GPU graphics processing and display subsystem.

Another object of the present invention is to provide such an Internet-based Central Application Profile Database Server System which, by enabling the automatic uploading of APs into the multi-GPU graphics processing and display subsystem, so that users of both desktop and mobile PC-based computing systems can immediately enjoy high performance graphics on the display devices of their client machines.

These and other objects of the present invention will become apparent hereinafter and in the claims to invention.

BRIEF DESCRIPTION OF DRAWINGS OF PRESENT INVENTION

Figure 2A:
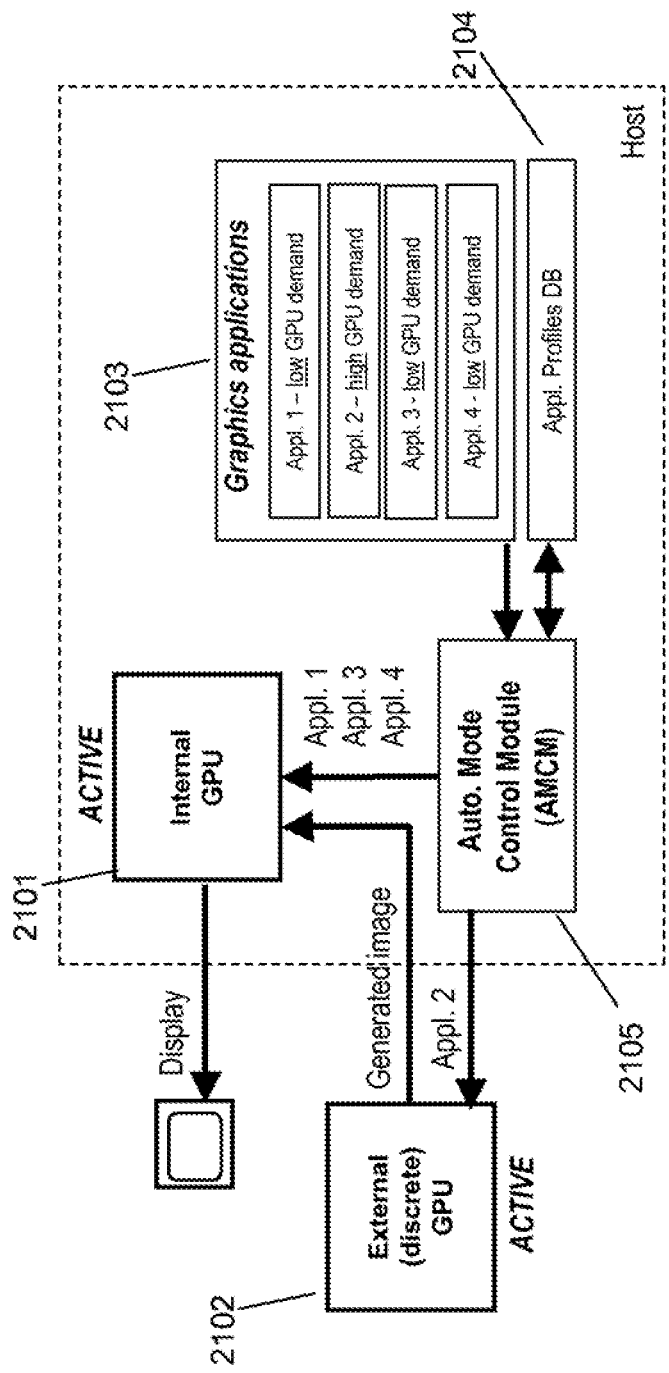
Figure 2B:
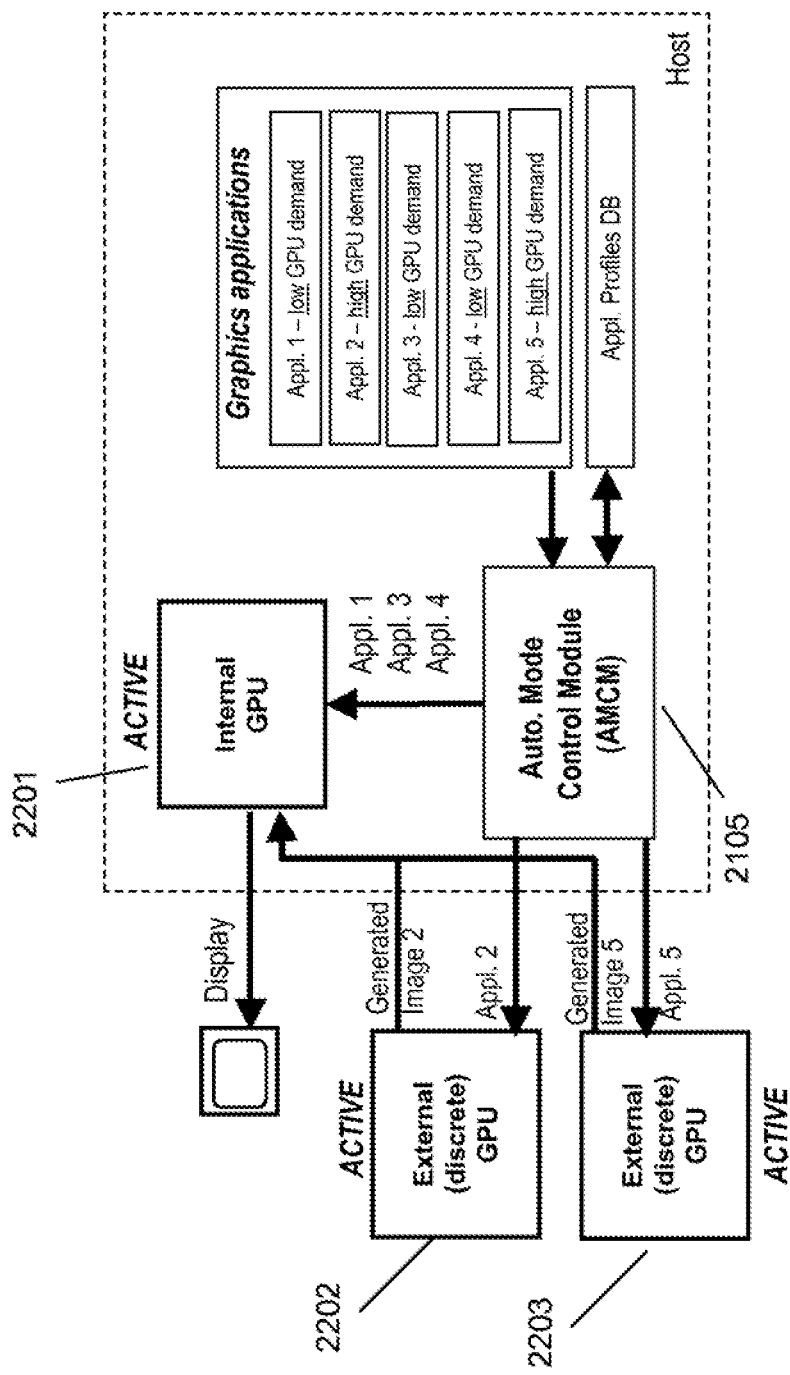
Figure 2D:
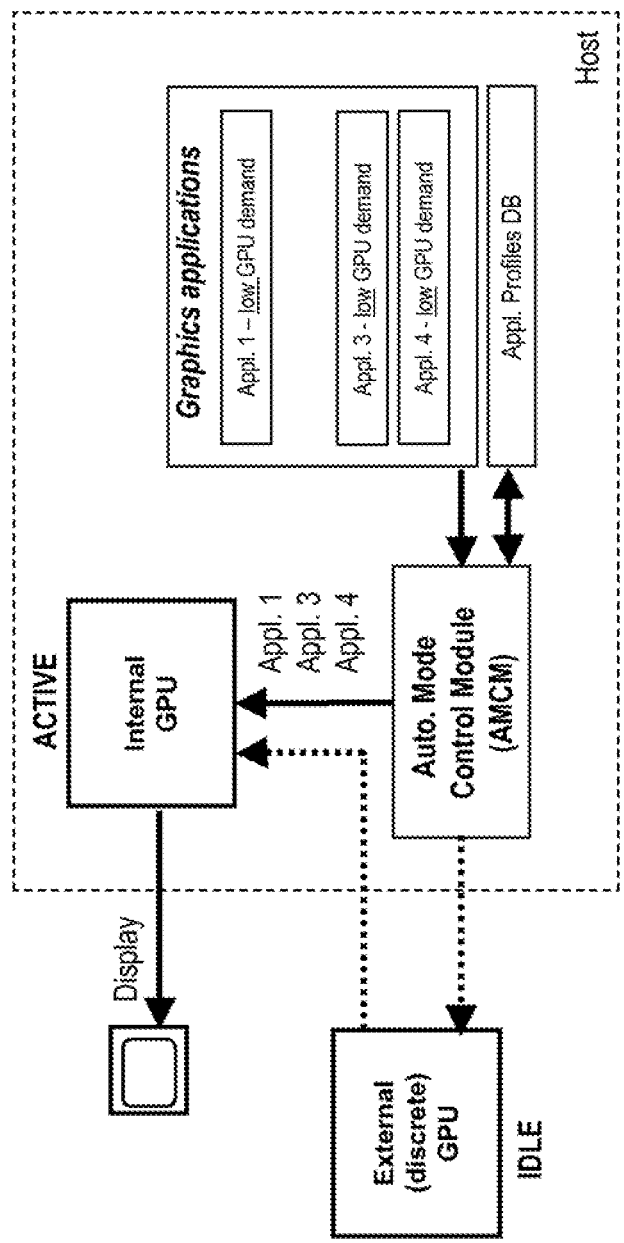
Figure 2E:
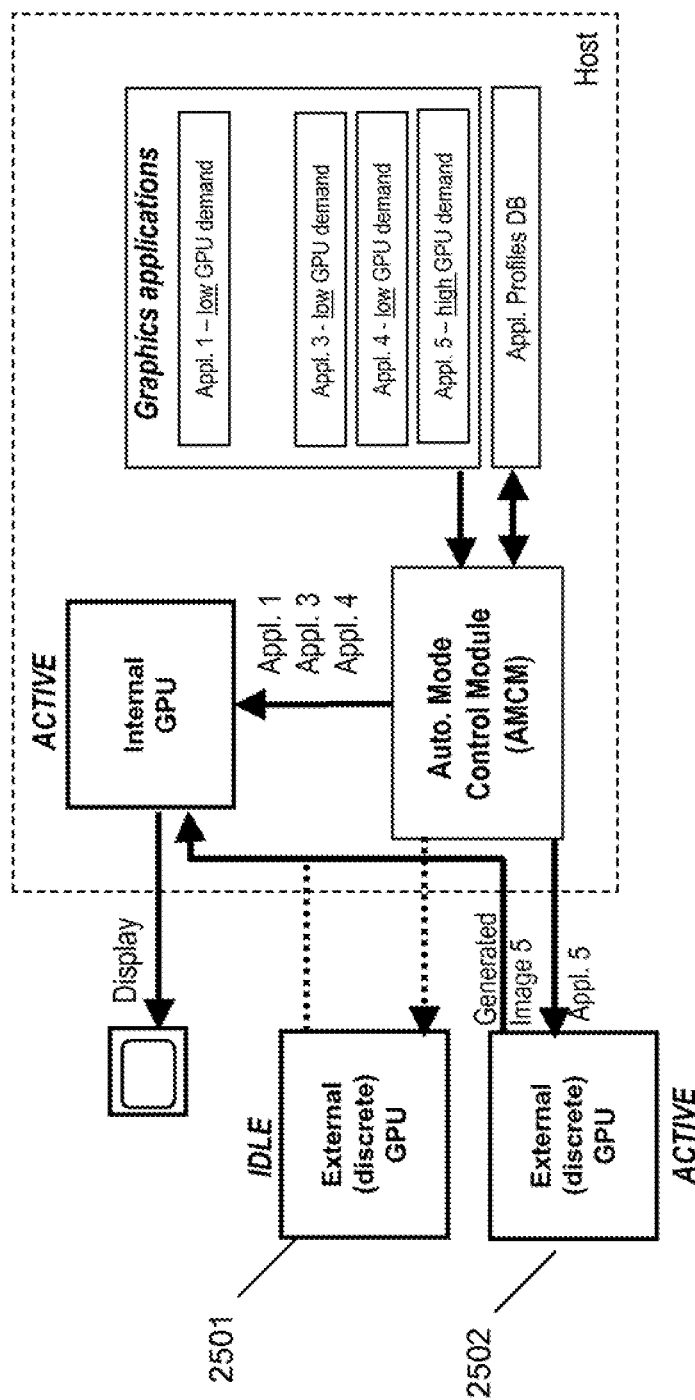
Figure 2F:
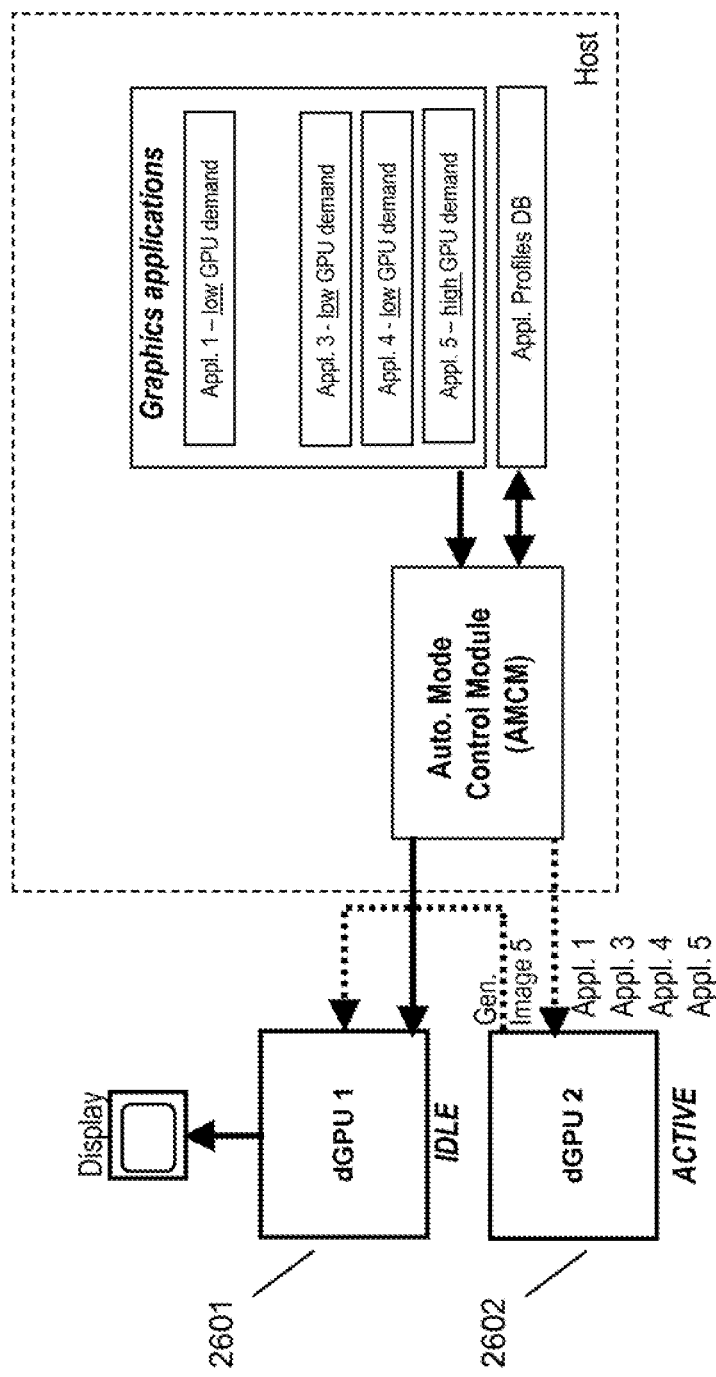
Figure 3:
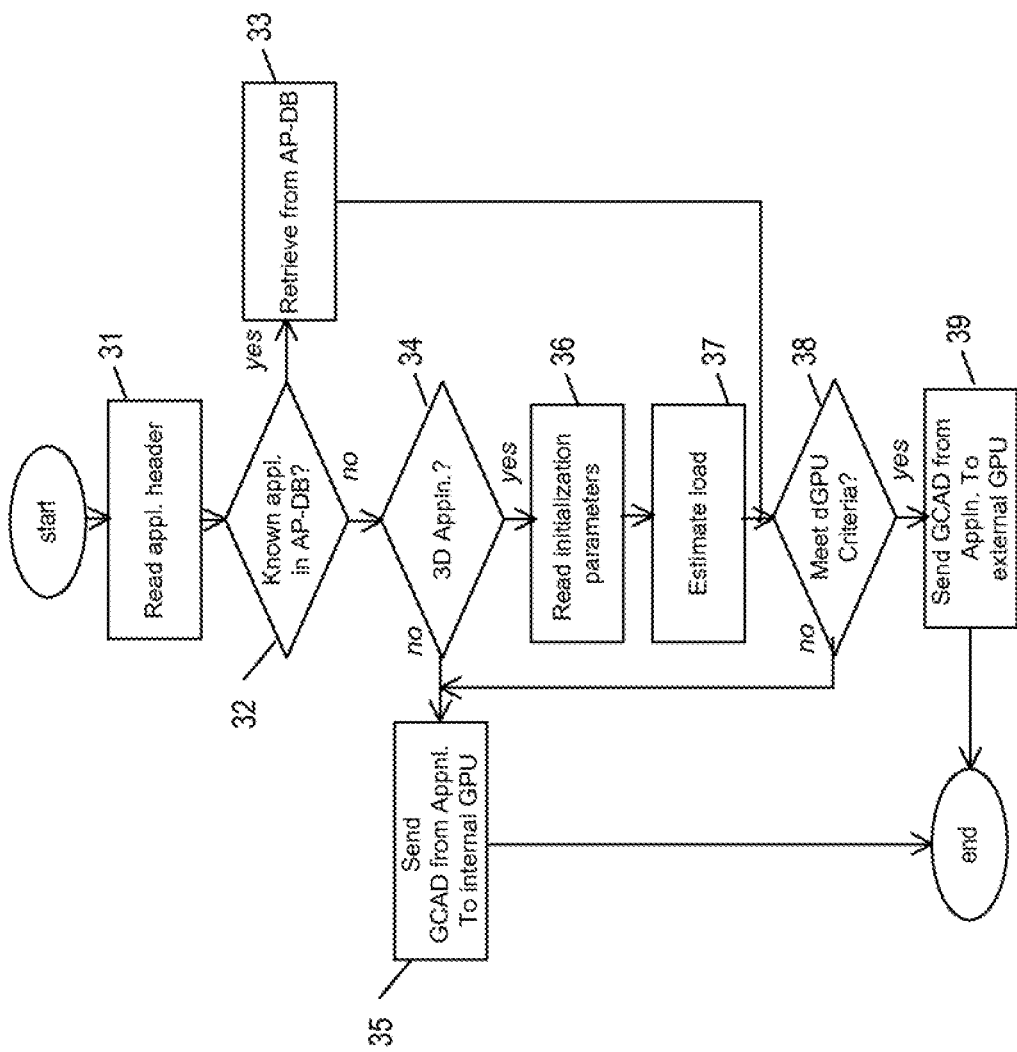
Figure 4A:
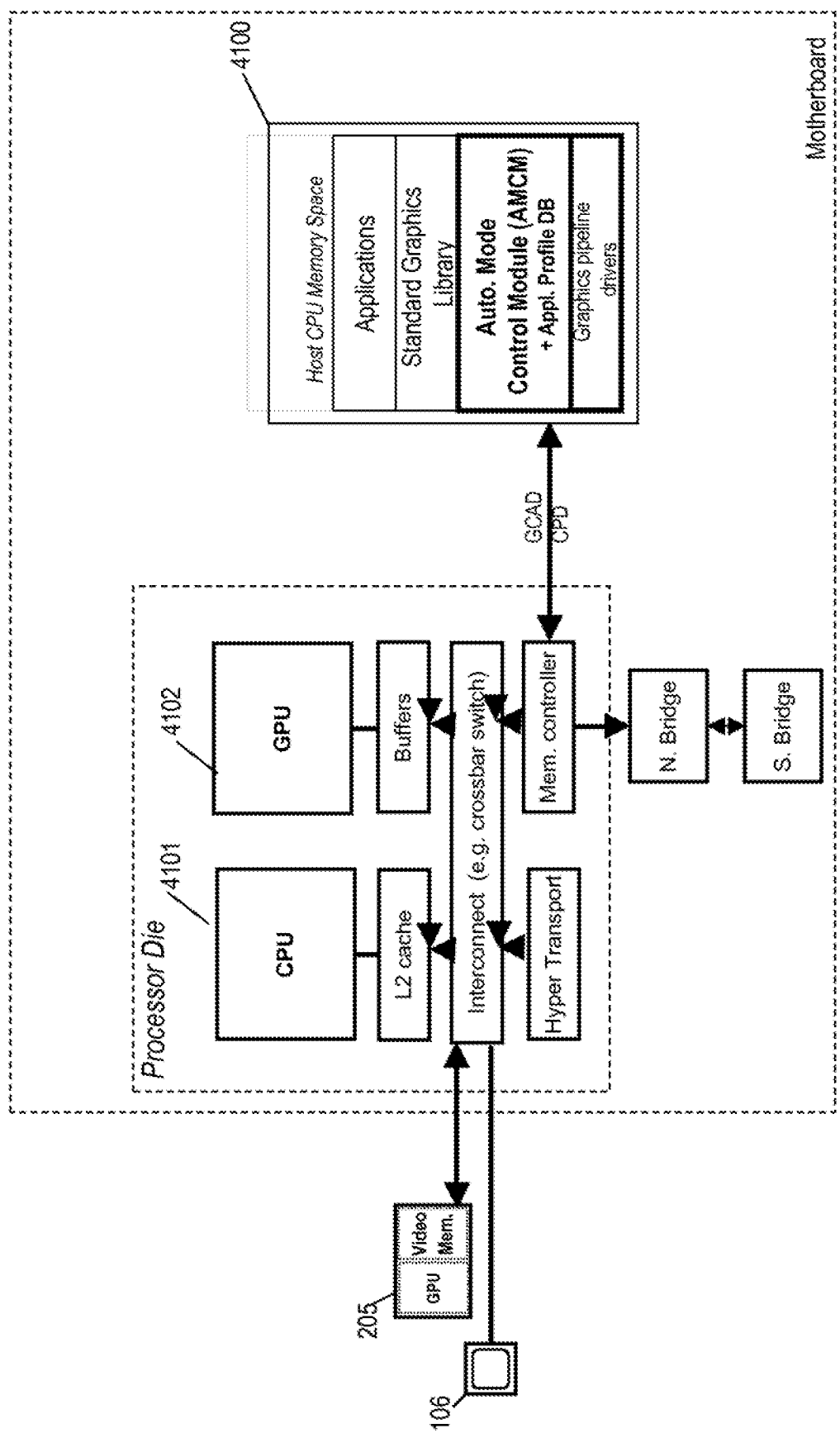
Figure 4B:
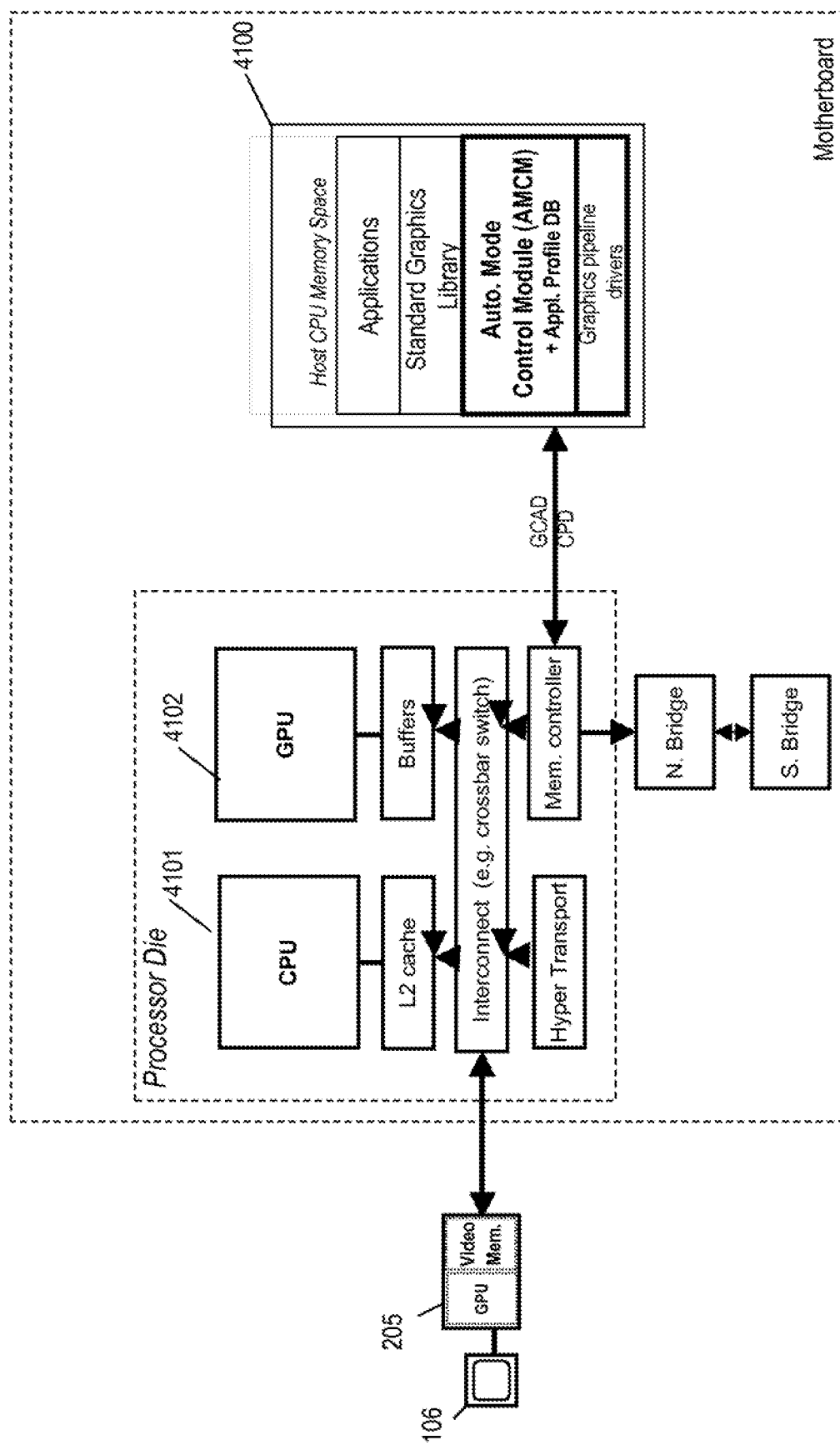
Figure 4C:
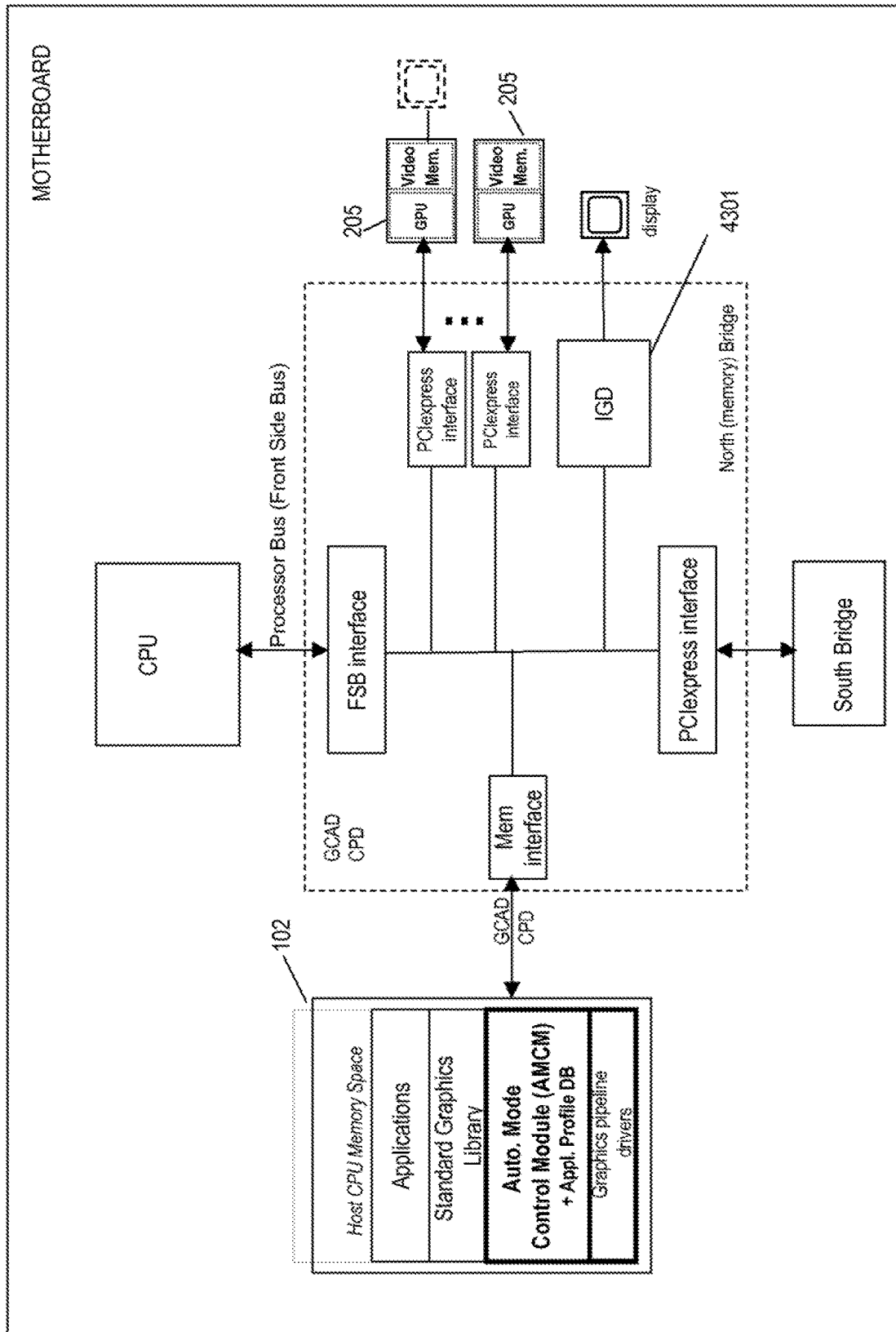
Figure 4D:
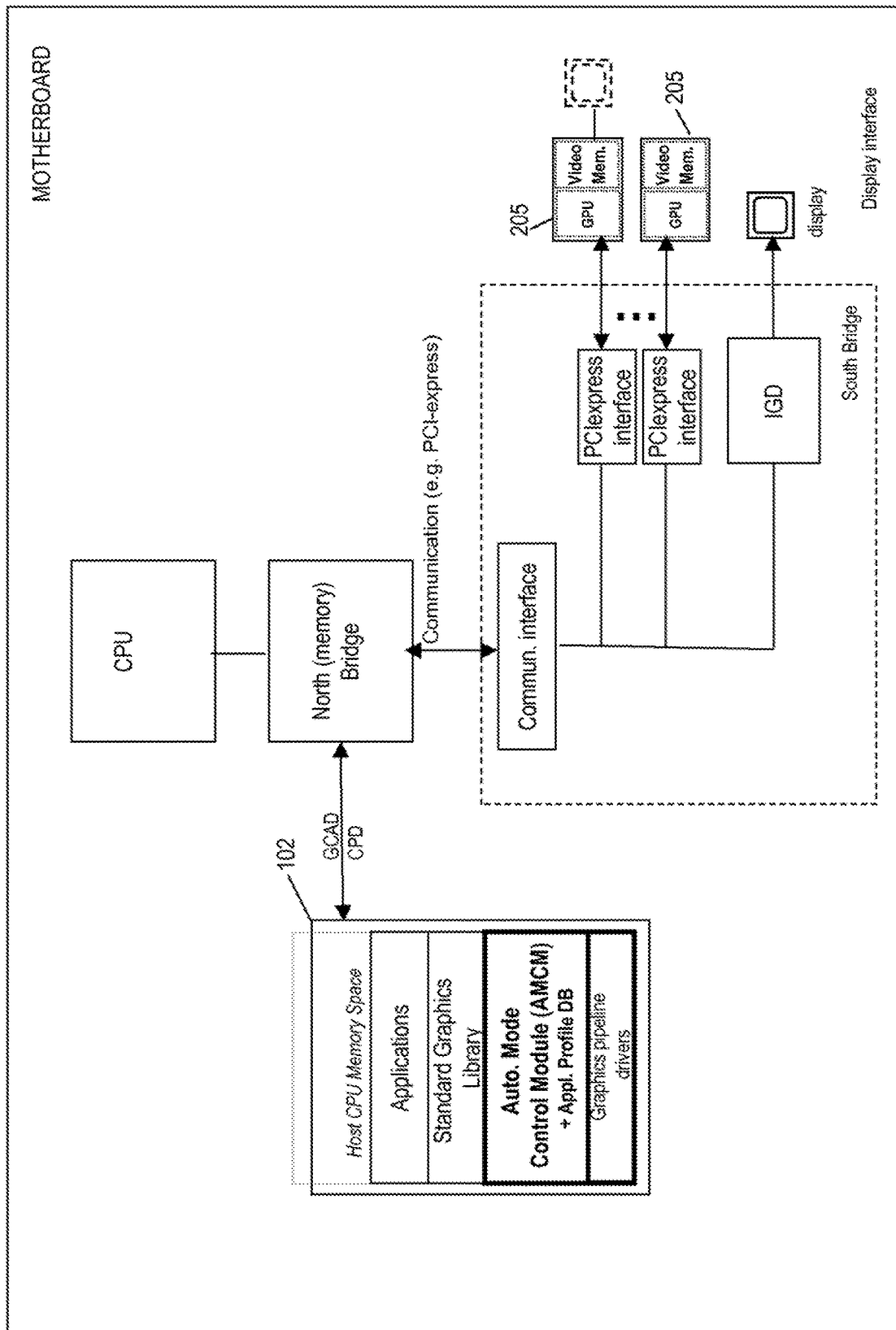
Figure 4E:
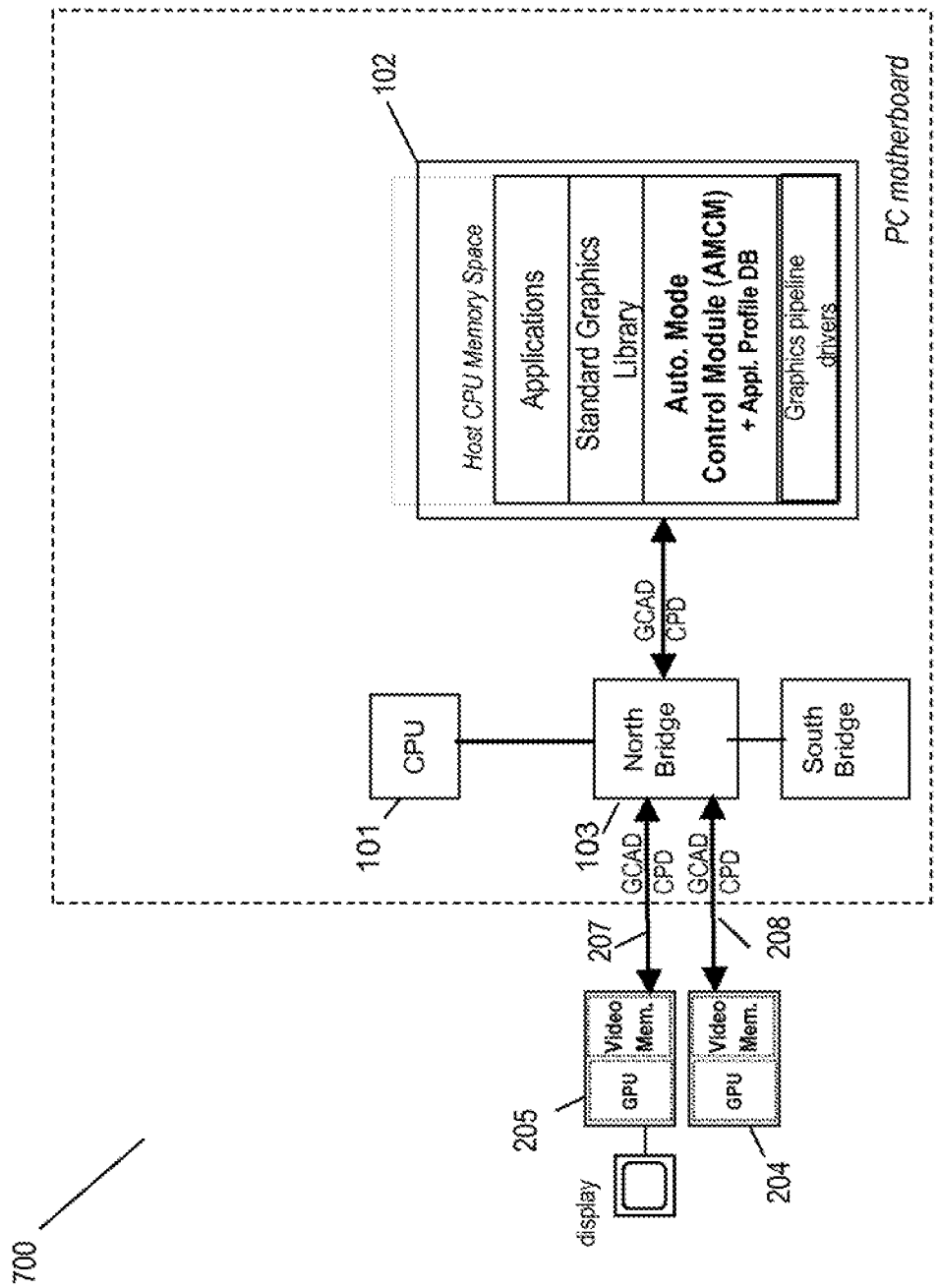
Figure 5A:
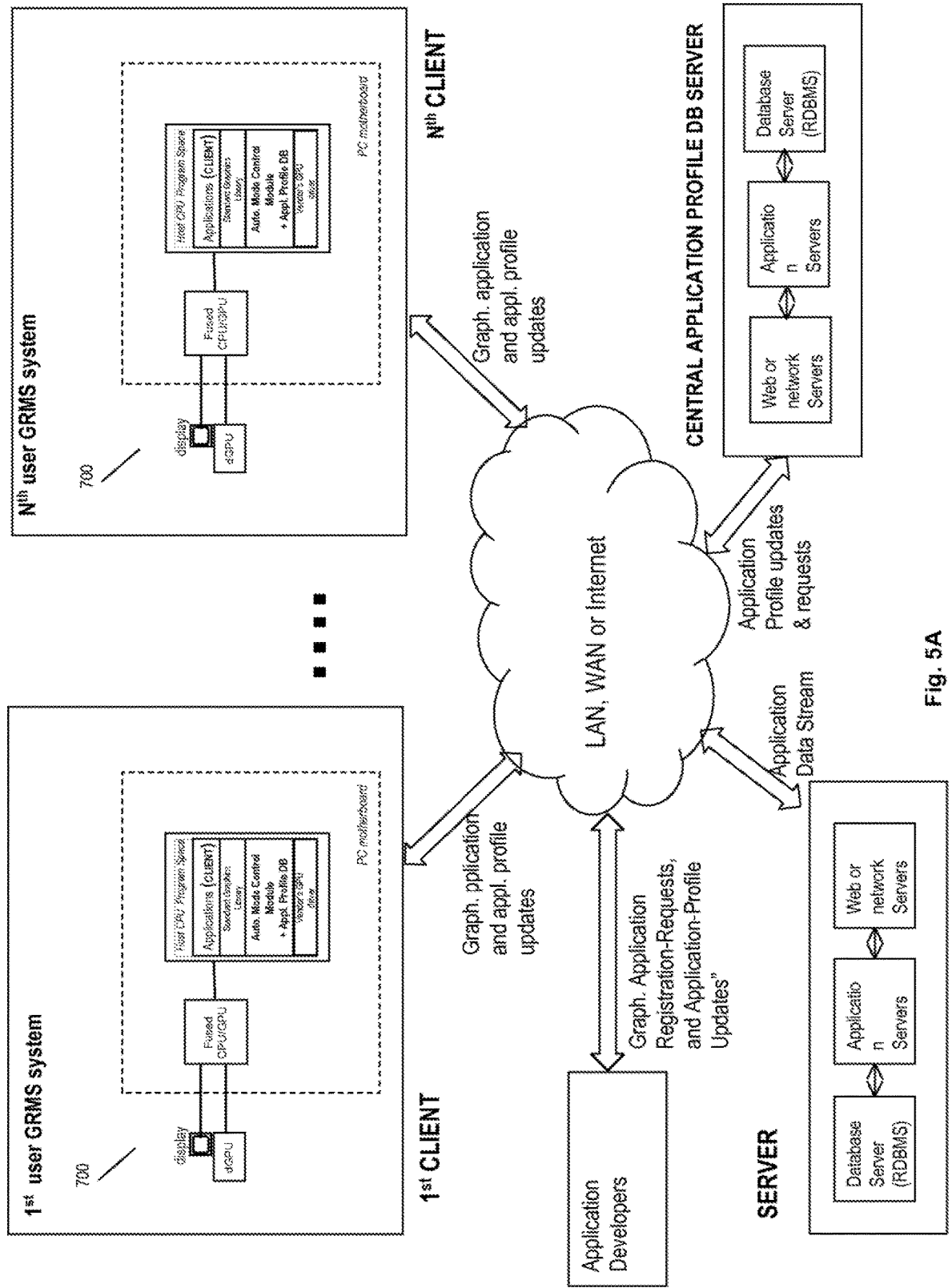

For a more complete understanding of how to practice the Objects of the Present Invention, the following Detailed Description of the Illustrative Embodiments can be read in conjunction with the accompanying Drawings, briefly described below:

FIG. IA is a graphical representation of a typical prior art PC-based computing system employing a conventional graphics architecture employing a North memory bridge circuit (i.e. semiconductor chip of monolithic construction) driving a display, and being operably coupled to a South bridge circuit (i.e. semiconductor chip of monolithic construction) supporting the input/output ports of the system;

FIG. 1B is a graphical representation of a prior art PC-based computing system employing a conventional Fusion-type CPU/GPU hybrid architecture, wherein a single GPU implemented on the same semiconductor die as the CPU is used to support a graphics pipeline that drives an external display device, e.g. LCD panel, projection display or the like (106), via a bridge circuit, with display interface, as shown;

FIG. 1C is a graphical representation of a prior art PC-based computing system employing the Fusion CPU/GPU hybrid architecture of FIG. 1B, wherein the display is connected to an internal GPU via display interface built into a bridge connected to a memory controller;

FIG. 1D is a graphical representation of a prior art PC-based computing system employing a conventional graphics architecture employing a North memory bridge circuit (i.e. semiconductor chip of monolithic construction) with an integrated graphics device (IGD) (103) supporting a single graphics pipeline process, and being operably coupled to a South bridge circuit (i.e. semiconductor chip of monolithic construction) supporting the input/output ports of the system;

FIG. 1 E is a graphical representation illustrating the general software architecture of the prior art computing system shown in FIGS. 1A and 1D;

FIG. 2A is a schematic representation of a PC-based computing system of the present invention employing a multi-GPU graphics processing and display subsystem having one internal GPU and one external GPU and supporting single-GPU non-parallel (i.e. multi-threading) modes of graphics processing operation, wherein automated mode control involves the real-time analysis of the various graphics-based applications running on the PC-based computing system, and showing the case where the external GPU is used to support the graphics processing requirements of the high demanding graphics-based application (2) configured in the single-GPU non-parallel (i.e. multi-threading) mode of graphics processing operation, and while the internal GPU supports the graphics processing requirements of all low demanding applications (1,3,4) also configured in the single-GPU non-parallel (i.e. multi-threading) mode of graphics processing operation;

FIG. 2B is a schematic representation of a PC-based computing system of the present invention employing a multi-GPU graphics processing and display subsystem having one internal GPU and two external CPUs and supporting a single-GPU non-parallel (i.e. multi-threading) mode of graphics processing operation and/or a multi-GPU "application-division" parallel mode of graphics processing operation, wherein automated mode control involves the real-time analysis of the various graphics-based applications running on the PC-based computing system, and showing the case where the external GPUs are used to support the graphics processing requirements of high demanding graphics-based applications (2,5) configured in the multi-GPU application-division parallel mode of graphics processing operation, and the internal GPU supports the graphics processing requirements of all low demanding applications (1,3,4) configured in the single-GPU non-parallel mode of graphics processing operations;

FIG. 2C is a graphical representation of an exemplary desktop GUI supported on a PC-based computing system of the present invention, depicted in FIGS. 2A and/or 2B, showing an exemplary GUI with five separate windows for five graphics applications concurrently running (executing) on the CPU of the computing system, wherein the GPU virtualization process of the present invention, involving different GPUs potentially rendering the pixels for different application windows, effectively decouples the link between the actual GPU where the application runs, and the GUI window in which it is displayed;

FIG. 2D is a schematic representation of a PC-based computing system of the present invention employing a multi-GPU graphics processing and display subsystem having one internal moderate GPU and one powerful external GPU and supporting single-GPU non-parallel (i.e. multi-threading) modes of graphics processing operation, wherein automated mode control involves the real-time analysis of the various graphics-based applications running on the PC-based computing system, and showing the case where all the graphics applications (1,3,4) running on the CPU of the are oflow GPU demand, and thus all graphics processing requirements thereof are served by the internal GPU configured in the single-GPU non-parallel (multi-threading) mode of graphics processing operation, while the external GPU induced into its idle state, thereby saving power by reduced power drain;

FIG. 2E is a schematic representation of a PC-based computing system of the present invention employing a multi-GPU graphics processing and display subsystem having one moderate power internal GPU and two powerful external GPUs and supporting both a single-GPU non-parallel (i.e. multi-threading) mode of graphics processing operation and a multi-GPU "application-division" parallel mode of graphics processing operation, wherein automated mode control involves the real-time analysis of the various graphics-based applications running on the PC-based computing system, and showing the case where the internal GPU supports the graphics processing requirements of all low demanding applications (1,3,4,) configured in the single-GPU non-parallel mode of graphics processing operation, while only one external GPU is used to support the graphics processing requirements of a high demanding graphics-based application 5 configured in the single-GPU non-parallel mode of graphics processing operation, while the second external GPU is induced into its idle state, thereby reducing electrical power drain in the computing system;

FIG. 2F is a schematic representation of a PC-based computing system of the present invention employing a multi-GPU graphics processing and display subsystem having no internal GPU but two powerful external CPUs and supporting both a single-GPU multi-threading (non-parallel) mode of graphics processing operation and a multi-GPU "application-division" parallel mode of graphics processing operations, wherein automated mode control involves the real-time analysis of the various graphics-based applications running on the PC-based computing system, and showing the case where the available graphics strength/power surpasses the needs of the graphics applications, and only one external GPU is used to support the graphics processing requirements of a graphics-based application (1,3, 4, 5) configured in the single-GPU non-parallel mode of graphics processing operation, while the second external GPU is induced into its idle state, thereby reducing electrical power drain in the computing system;

FIG. 3 shows a flow chart describing the steps involved the decision process carried out by the automatic mode control module (AMCM) employed in the multi-GPU graphics processing and display subsystem embodied in the PC-based computing system of the present invention;

FIG. 4A is a schematic representation of a PC-based computing system of the present invention employing a hybrid CPU/GPU fusion environment with system memory and having a multi-GPU graphics processing and display subsystem, wherein the AMCM and Application Profile Database (DB) are implemented as a software module, the integrated GPU and discrete external CPUs on an external GPU card are interfaced with an interconnect, and in communication with the AMCM and adapted for non-parallel (i.e. multi-tasking) graphics processing application, and the display is operably connected (i.e. interfaced) to the integrated GPU through the interconnect;

FIG. 4B is a schematic representation of a PC-based computing system of the present invention employing a hybrid CPU/GPU fusion environment with system memory and having a multi-GPU graphics processing and display subsystem, wherein the AMCM and Application Profile Database (DB) are implemented as a software module, the integrated GPU is interfaced with an interconnect, and GPUs on an external GPU card are interfaced with the interconnect and in communication with the AMCM and adapted for non-parallel (i.e. multi-tasking) graphics processing application, and the display is operably connected to the GPU on the external graphics card;

FIG. 4C is a schematic representation of a PC-based computing system of the present invention employing a CPU with system memory and having a multi-GPU graphics processing and display subsystem, wherein the AMCM and Application Profile Database (DB) are implemented as a software module, an IGD residing on north bridge is in communication with the AMCM, the GPUs on an external graphic card(s) are in communication with the AMCM and adapted for application-division parallelism, and the display is connected either to a primary GPU (IGD) or a primary GPU one of the external graphics cards;

FIG. 4D is a schematic representation of a PC-based computing system of the present invention employing a CPU with system memory and a North (Memory) Bridge and having a multi-GPU graphics processing and display subsystem, wherein the AMCM and Application Profile Database (DB) are implemented as a software module, an IGD residing on South Bridge is in communication with the AMCM, the GPUs on external graphic card(s) are in communication with the AMCM and adapted for application-division parallelism, and the display is connected either to the IGD or a primary GPU on an external graphics card;

FIG. 4E is a schematic representation of a PC-based computing system of the present invention employing a CPU with system memory and a North (Memory) Bridge and South Bridge and having a multi-GPU graphics processing and display subsystem, wherein the AMCM and Application Profile Database (DB) are implemented as a software module, the GPUs residing on the dual external graphics cards are in communication with the AMCM and adapted for application-division parallelism, and the display is connected to the primary GPU on the external graphics card, and power savings mode can be exercised on the external GPUs; and FIG. 5A is a schematic representation of Central Application Profile Database (DB) Server System, implemented on a multi-user computer network supporting a plurality of client machines, wherein each client machine embodies multi-GPU graphics processing and display subsystem according to the present invention, and supporting an Application Profile (AP) Database (DB) in the subsystem, and periodically updating and distributing Application Profiles to all client machines registered on the network for such services.

DETAILED DESCRIPTION OF THE ILLUSTRATIVE EMBODIMENTS OF THE PRESENT INVENTION

Referring now to FIGS. 2A through 5A in the accompanying Drawings, the various illustrative embodiments of the computing system of the present invention will be described in great technical detail, wherein like elements will be indicated using like reference numerals. The primary motivation of present invention is to better manage the use of electrical and graphics-processing power in modern PC computer system environments where running diverse applications simultaneously in a multi-tasking environment is commonplace.

Power management turns off the power of external GPU to a low-power state when inactive. It is desired particularly for graphics because of the high power consumption of high-end GPUs. Power management reduces overall energy consumption, prolongs battery life for portable graphics systems, reduces cooling requirements, reduces noise, and reduces operating costs for energy and cooling. Lower power consumption also means lower heat dissipation, which increases system stability, and less energy use, which saves money and reduces the impact on the environment.

The multi-GPU graphics processing and display subsystem of the present invention is able to assign graphics tasks in real time to the best available graphics resource(s) available on a multi-GPU graphics processing and display subsystem based on power, performance and feature considerations, with no need for additional hardware. If high-end graphics power is needed for applications like DirectX 11, high-resolution 3D gaming, then the subsystem will automatically assign the job to the discrete GPU supported on the subsystem. If not, then the discrete GPU is automatically induced into its idle power mode, causing the heat transfer level to drop, fan speed slow down and GPU utilization decrease down to zero, resulting in a green, power-efficient, long-lasting graphics processing and display system.

In general, the PC-based computing system of the present invention, regardless of particular implementation, is capable of parallelizing the operation of one or more internal GPUs supported internally on the motherboard of the system, and one or more external GPUs supported on one or more external graphics cards. Typically, the computing system comprises the following components: CPU memory space (e.g. RAM) for storing (i) at least one operating system (OS) program supporting a GUI-based desktop windows environment with multiple display windows as shown in FIG. 2C, (ii) multiple graphics-based applications and graphics libraries (e.g. OpenGL or DirectX) for generating graphics commands and data (GCAD) during the execution of the graphics-based applications, and (iii) vendor drivers for internal and external GPUs supported within the system; one or more CPUs for executing the OS and its desktop windows environment described above, and multiple graphics applications simultaneously on the desktop environment of the computing system, and a memory controller for controlling the CPU's and GPUs access to the CPU memory space; one or more external graphics cards supporting one or more external GPUs; hard-drive or persistent memory storage; one or more internal GPUs which may be realized in the form of an IGD or GPU realized in a hybrid GPU/CPU chip environment, or a multi-core CPU environment; a multi-GPU graphics processing and display subsystem supporting a plurality of graphic processing pipelines (GPPLs) implemented using multiple internal GPUs, and/or multiple external GPUs, and supporting both a single-GPU non-parallel (i.e. multi-threading) mode of graphics processing operation and a multi-GPU "application-division" parallel mode of graphics processing operation, in order to execute graphic commands, process graphics data, and render pixel-composited images containing graphics for display on a display device during the run-time of the graphics-based applications, wherein the display device is connectable to at least one the external or internal GPUs functioning as the designated primary GPU; and an automatic mode control module (AMCM) for automatically and simultaneously analyzing— in real-time—the various multiple graphics applications that are likely to be running on different threads in a PC computing environment, and which contribute to the collective/composite "graphics environment" that is supported at any instant on the PC computing system. The AMCM also controls the mode of operation of the multi-GPU graphics processing and display subsystem (i.e. platform) in response to such real-time graphics application analysis.

During system operation, the AMCM balances the graphics load between internal GPU and single or multiple external GPUs. In general, the internal GPU excels in advanced power-efficiency, built-in media features, and rather moderated graphics processing capabilities. The internal GPU, called also IGP (Integrated Graphics Processor), or IPG (Intel Processing Graphics), can be found in various architectures and locations of computing systems, including in North Bridge or in Fused CPU/GPU chip (e.g. Sandy Bridge by Intel). The external GPU, termed also Discrete GPU (dGPU) is typically more powerful, but is also the primary power consumer in computing systems.

The real-time analysis of multiple graphics applications running on the PC computing system by AMCM is intended to estimate the graphics load of those applications. The load considerations are based on following parameters: (i) all 2D graphics applications, as well as media applications, are considerably less demanding than 3D graphics applications (such as video games), and thus are candidates to run on internal GPU; (ii) the estimated load of 3D applications is based on graphics parameters that are typically set during initialization phase, such as anti-aliasing, Resolution, etc.; (iii) the above factors of known applications can be gathered either offline or in runtime and saved in a data base (DB) of application profiles (APs), held by AMCM. These application profiles (APs) are verified by measuring actual run times, and kept updated in the DB for successive runs.

The multi-GPU graphics processing and display subsystem automatically supports both a single-GPU non-parallel (i.e. multi-threading) mode of graphics processing operation and/or a multi-GPU "application-division" parallel mode of graphics processing operation, to optimize the use of electrical power consumption and computing resources (graphics power), as needed for each application running on the computing system. During maximal application load, while enabled and running a 3D application, all external GPUs in the system are enabled and running in parallel, while applications are divided among GPUs, such that the heavy graphics application run on dGPUs, and other applications run on internal GPUs. In general, 3D graphics applications based on OpenGL and DirectX graphics libraries are considered to be heavier than 2D and media applications, in terms of the graphics processing operations required to execute graphics commands and data (GCAD) streams issuing from such applications.

FIG. 2A shows a PC-based computing system of the present invention employing a multi-GPU graphics processing and display subsystem having one internal GPU and one external GPU and supporting single-GPU non-parallel (i.e. multi-threading) modes of graphics processing operation. In this illustrative embodiment, the automated mode control module (AMCM) in the PC-based computing system performs real-time analysis of the various graphics-based applications running on the computing system. Also, in FIG. 2, the case is shown where the external GPU is used to support the graphics processing requirements of the high demanding graphics-based application (2) configured in the single-GPU non-parallel (i.e. multi-threading) mode of graphics processing operation, while the internal GPU supports the graphics processing requirements of all low demanding applications (1,3,4) also configured in the single-GPU non-parallel (i.e. multi-threading) mode of graphics processing operation. As such, the graphics command and data (GCAD) stream from the lighter graphics applications 1,3 and 4 are assigned (i.e. distributed) to the internal GPU configured in the single-GPU non-parallel (i.e. multi-threading) mode of graphics processing operation. The processing power of external GPU is dedicated exclusively to the GCAD stream from high demanding Application 2. In this case, the external GPU is also configured in the single-GPU non-parallel (i.e. multi-threading) mode of graphics processing operation. The decision is carried out in real-time by AMCM, using the process specified in FIG. 3, and the GCAD streams from the graphics applications are automatically redirected to the GPU resources, accordingly. In this embodiment, the display is permanently connected to the internal GPU, therefore each image frame generated in dGPU must be transferred to the internal GPU for merging with other graphics images of the various applications, to composite a complete desktop (GUI) image which is then moved to the display device display.

FIG. 2B shows a PC-based computing system of the present invention employing a multi-GPU graphics processing and display subsystem having one internal GPU configured in a single-GPU non-parallel mode of graphics processing operation, and two external GPUs configured in an multi-GPU application-division parallel mode of graphics processing operation. In this case, the graphics processing power of the external GPU is dedicated exclusively processing the GCAD stream of the high demanding applications, 2 and 5. The internal GPU multi-processes the GCAD streams from all low demanding applications, 1, 3 and 4.

Graphics virtualization according to the present invention multiplexes physical hardware by presenting each GPU with a virtual device and combining its respective operations in the graphics system in a way that utilizes native hardware while preserving the illusion that each application has a complete stand-alone device. This virtualization principle is demonstrated in FIG. 2C, showing possible screen look for images of graphics applications of the given example. Each application's image is located in a separate window. In the user's eyes, GPU virtualization decouples the link between the actual GPU where the application runs, and the window it shows.

The manner in which power management of AMCM turns off the power of external GPU to a low-power state when inactive, is shown in FIGS. 2D and 2E.

FIG. 2D shows a PC-based computing system of the present invention employing a multi-GPU graphics processing and display subsystem having one internal moderate GPU and one powerful external GPU and supporting, each configured in a single-GPU non-parallel (i.e. multi-threading) modes of graphics processing operation. In FIG. 2D, automated mode control involves the real-time analysis of the various graphics-based applications running on the PC-based computing system, and showing the case where all the graphics applications (1,3,4) running on the CPU are of low GPU processing demand, and thus all graphics processing requirements thereof are served by the internal GPU configured in the single-GPU non-parallel (multi-threading) mode of graphics processing operation, while the external GPU induced into its idle state, thereby saving power by reduced power drain. Since the available graphics strength of the GPUs surpasses or exceeds the need of the graphics applications, the GCAD stream from these applications are distributed in such a way that one GPU remains inactive, i.e. turned down to low-power state, to conserve electrical power/energy.

FIG. 2E shows a PC-based computing system of the present invention employing a multi-GPU graphics processing and display subsystem having one moderate power internal GPU configured in a single-GPU non-parallel (i.e. multi-threading) mode of graphics processing operation, and two powerful external GPUs configured in a multi-GPU "application-division" parallel mode of graphics processing operation. In FIG. 2E, automated mode control involves the real-time analysis of the various graphics-based applications running on the PC-based computing system, and showing the case where the internal GPU supports the graphics processing requirements of all low demanding applications (1,3,4) configured in the single-GPU non-parallel mode of graphics processing operation, while only one external GPU is used to support the graphics processing requirements of a high demanding graphics-based application 5 configured in the single-GPU non-parallel mode of graphics processing operation, while the second external GPU is induced into its idle state, thereby reducing electrical power drain in the computing system.

The presence of internal GPU is not a requirement when practicing the principles of the present invention. Resource management by way of application division can be performed on external GPUs, in the absence of an internal GPU or IGD. This inventive concept is illustrated in FIG. 2F, where there is shown, a PC-based computing system employing a multi-GPU graphics processing and display subsystem having no internal GPU, but two powerful discrete external GPUs capable of supporting both a single-GPU multi-threading (non-parallel) mode of graphics processing operation and a multi-GPU "application-division" parallel mode of graphics processing operation. In this embodiment, automated mode control involves the real-time analysis of the various graphics-based applications running on the PC-based computing system. In FIG. 2F, the case shows where the available graphics strength/power surpasses the needs of the graphics applications, and only one external GPU is used to support the graphics processing requirements of a graphics-based application (1,3,4,5) configured in the single-GPU non-parallel mode of graphics processing operation, while the second external GPU is induced into its idle state, thereby reducing electrical power drain in the computing system.

Based on the logical decision process carried out by AMCM, the GCAD stream from each graphics application is sent to external or internal GPU(s). The flowchart of FIG. 3 specifies the decision process carried out by the AMCM in the multi-GPU graphics processing and display subsystem of each PC-based computing system of the present invention. This process is invoked once for each graphics-based application executed by the CPU of the computing system, and it is done so automatically at the beginning of the launching of the graphics-based application. Based on the results of this process, the stream of CGAD from the application is (re)directed to the indicated GPU within the multi-GPU graphics processing and display subsystem of the computing system.

As indicated at Block 31 in FIG. 3, the first step involves reading basic information found in application's header.

As indicated at Block 32 in FIG. 3, the name of the graphics application is looked up in the Application Profiles (AP) Data Base (DB). In the illustrative embodiment, the AP-DB maintains two different lists of graphics application profiles (APs), namely: (1) a first list of all graphics applications having relatively light graphics processing load requirements (e.g. email applications, spreadsheets, IM chat clients, work-processing applications, slide presentation programs, web browsers running Flash plug-ins etc) whose GCAD stream should be sent to an internal GPU (e.g. IGD or hybrid CPU/GPU chip) or external GPU configured for a non-parallel (i.e. multi-tasking) mode of graphics processing operation, as the case may require for power conservation reasons; and (2) a second list of all graphics application having relatively high graphics processing load requirements (e.g. 3D graphics applications) whose GCAD stream should be sent to a single external GPU configured in a non-parallel (i.e. multi-tasking) mode of graphics processing operation, or to multiple external GPUs configured in the "application-division" parallel mode of graphics processing application, as described herein.

As indicated at Block 33 in FIG. 23, the application name is found in the AP-DB, then the application profile is retrieved from Application Profile DB maintained with the multi-GPU graphics processing and display subsystem. Otherwise, as Block 34, the application name is searched for in the 3D class (OpenGL or DirectX application). As indicated at Block 35, if the application is not a 3D graphics application, then its GCAD stream is sent to internal GPU.

At Block 36 in FIG. 3, 3D applications, not previously known, are analyzed for initialization parameters (e.g. AA, resolution), the load is coarsely estimated at Block 37, and accordingly decision is made for internal GPU at Block 35, or external GPU at Block 39.

FIGS. 4A through 4E provide illustrative examples of various architectures in which graphics resources are dynamically managed using the novel principles of the present invention using a multi-GPU graphics processing and display subsystem supporting a single-GPU non-parallel mode of graphics processing operation and/or multi-GPU "application-division" parallel mode of graphics processing operation.

FIG. 4A shows a PC-based computing system of the present invention employing a hybrid CPU/GPU fusion environment with system memory and having a multi-GPU graphics processing and display subsystem, wherein the AMCM and Application Profile Database (DB) are implemented as a software module, the integrated GPU and discrete external GPUs on an external GPU card are interfaced with an interconnect, and in communication with the AMCM and adapted for non-parallel (i.e. multi-tasking) graphics processing application, and the display is operably connected (i.e. interfaced) to the integrated GPU through the interconnect.

FIG. 4B shows a PC-based computing system of the present invention employing a hybrid CPU/GPU fusion environment with system memory and having a multi-GPU graphics processing and display subsystem, wherein the AMCM and Application Profile Database (DB) are implemented as a software module, the integrated GPU is interfaced with an interconnect, and GPUs on an external GPU card are interfaced with the interconnect and in communication with the AMCM and adapted for non-parallel (i.e. multi-tasking) graphics processing application, and the display is operably connected to the GPU on the external graphics card.

FIG. 4C is a schematic representation of a PC-based computing system of the present invention employing a CPU with system memory and having a multi-GPU graphics processing and display subsystem, wherein the AMCM and Application Profile Database (DB) are implemented as a software module, an IGD residing on north bridge is in communication with the AMCM, the GPUs on an external graphic card(s) are in communication with the AMCM and adapted for application-division parallelism, and the display is connected either to a primary GPU (IGD), or alternatively to a primary GPU one of the external graphics cards.

FIG. 4D is a schematic representation of a PC-based computing system of the present invention employing a CPU with system memory and a North (Memory) Bridge and having a multi-GPU graphics processing and display subsystem, wherein the AMCM and Application Profile Database (DB) are implemented as a software module, an IGD residing on South Bridge is in communication with the AMCM, the GPUs on external graphic card(s) are in communication with the AMCM and adapted for application-division parallelism, and the display is connected either to the IGD, or alternatively to a primary GPU on an external graphics card.

FIG. 4E shows a PC-based computing system of the present invention employing a CPU with system memory and a North (Memory) Bridge and South Bridge and having a multi-GPU graphics processing and display subsystem. In this illustrative embodiment, the AMCM and Application Profile Database (DB) are implemented as a software module, the GPUs residing on the dual external graphics cards are in communication with the AMCM and adapted for application-division parallelism, and the display is connected to the primary GPU on the external graphics card. The power savings mode can be exercised on the external GPUs, and power savings mode can be exercised on one or more GPUs on the external graphics cards, according to graphics load.

FIG. 5A shows an automated way of updating the application profiles in the AP DBs of client machines. As shown, the Central Application Profile Database (DB) Server System of the illustrative embodiment comprises a cluster of Web (http) servers, interfaced with a cluster of application servers, which in turn are interfaced with one or more database servers (supporting RDBMS software), well known in the art. The Central Application Profile Database (DB) Server System would support a Web-based Application Registration and Profile Management Application.

Using the Central Application Profile Database (DB) Server System of the present invention, it is now possible to automatically and periodically upload, over the Internet, Graphic Application Profiles (APs) within the DB of the multi-GPU graphics processing and display subsystem of registered client machines. By doing so, graphic application users (e.g. garners) can immediately enjoy efficient resource management, without having to develop an application profile based on many hours of actual user-system interaction.

For Automatic AP management service subscribers, the multi-GPU graphics processing and display subsystem would preferably run an algorithm that uses the most recently downloaded expert AP loaded into its AMCM, until the next automated update occurs.

Applicants have disclosed how using the technology of the present invention, it is possible for next generation personal computing systems to dynamically balance the advanced power-efficient, built-in media features of modem-day processor graphics with the high-end, DirectX 11 3D performance features of discrete GPUs. At the same time, the present invention significantly reduces the power drain of traditional entertainment desktops.

The GPU virtualization solution of the present invention is able to assign tasks in real time to the best available graphics resource based on power, performance and features considerations, with no need for additional hardware, providing a seamless visual experience where it is not necessary to choose between the amazingly rich media features such as HD playback and powerful video transcoding, and the high-end 3D graphics functionality and performance of a discrete GPU.

While the illustrative embodiments of the present invention have been described in connection with various PC-based computing systems, including desktop and mobile computers, it is understood that that multi-GPU graphics processing and display subsystems, systems and processes of the present invention can also be used in mobile computing devices, video game consoles and systems, e-commerce and PUS displays and the like.

It is understood that the multi-GPU graphics processing and display technology employed in computer graphics systems of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

What is claimed is:

1. A system for providing power management application profiles for user devices, the system comprising:
    an application profile database that stores application profiles for a plurality of graphics-based applications, wherein each application profile for a particular graphics-based application enables an automatic mode control module for a multi-GPU graphics processing and display subsystem on user devices external to the system to automatically control, in each user device, the mode of operation of the multi-GPU graphics processing and display subsystem during the run-time of the particular graphics-based application so as to ensure efficient power management and graphics processing resource allocation; and
    wherein the application profile database provides, to each of a plurality of multi-GPU graphics processing and display subsystems external to the system, each multi-GPU graphics processing and display subsystems having at least one internal GPU and at least one external GPU and supporting multi-GPU application-division parallel modes of graphics processing in order to execute graphic commands and process graphics data and render pixel-composited images containing graphics for display on a display device during the run-time of the multiple graphics-based applications, the application profiles of the plurality of graphics-based applications.

2. The system of claim 1, wherein each multi-GPU graphics processing and display subsystem is a component of a registered client machine that is registered with the application profile database.

3. The system of claim 2, wherein each client machine is one of a mobile computing device or a desktop personal computer.

4. The system of claim 1, wherein the application profile database includes:
    a first list of graphics applications having first graphics processing load requirements; and a second list of graphics applications having second graphics processing load requirements; and wherein the second graphics processing load requirements are greater than the first graphics processing load requirements.

5. The system of claim 1, wherein each multi-GPU graphics processing and display subsystem that receives the application profiles is in data communication with an automatic mode control module.

6. The system of claim 1, wherein each automatic mode control module employs real-time detection of individual application profiles and determines which GPU or GPUs in the multi-GPU graphics processing and display subsystem should be assigned to process the stream of graphics command and data of particular graphics applications running on the computer system.

7. The system of claim 6, wherein the external GPU is put into an idle state in the event the real-time detection of an individual application profile indicates a low graphics load application.

8. The system of claim 6, wherein in the event that the real-time detection of an individual application profile indicates a high graphics load application, the automatic control module puts neither GPU into an idle state.

9. A method of managing power consumption in a-computing systems, the method comprising:

storing, in an application profile database system, profiles for a plurality of graphics-based applications, wherein each application profile for a particular graphics-based application enables an automatic mode control module for a multi-GPU graphics processing and display subsystem on user device external to the application profile database system, to automatically control, in each user device, the mode of operation of the multi-GPU graphics processing and display subsystem during the run-time of the particular graphics-based application so as to ensure efficient power management and graphics processing resource allocation; and providing, to each of a plurality of multi-GPU graphics processing and display subsystems external to the application profile database system, each multi-GPU graphics processing and display subsystems having at least one internal GPU and at least one external GPU and supporting multi-GPU application-division parallel modes of graphics processing in order to execute graphic commands and process graphics data and render pixel-composited images containing graphics for display on a display device during the run-time of the multiple graphics-based applications, the application profiles of the plurality of graphics-based applications.

\* \* \* \* \*